United States Patent
George et al.

(10) Patent No.: US 9,665,532 B2
(45) Date of Patent: *May 30, 2017

(54) PERFORMING SYNCHRONIZED COLLECTIVE OPERATIONS OVER MULTIPLE PROCESS GROUPS

(75) Inventors: Thomas George, Harayana (IN); Nikhil Jain, New Delhi (IN); Sameer Kumar, White Plains, NY (US); Anshul Mittal, Stanford, CA (US); Yogish Sabharwal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 468 days.

This patent is subject to a terminal disclaimer.

(21) Appl. No.: 13/600,983

(22) Filed: Aug. 31, 2012

(65) Prior Publication Data

US 2013/0339506 A1 Dec. 19, 2013

Related U.S. Application Data

(63) Continuation of application No. 13/495,647, filed on Jun. 13, 2012.

(51) Int. Cl.
G06F 15/16 (2006.01)
H04B 7/212 (2006.01)
H04J 3/14 (2006.01)
G06F 15/173 (2006.01)

(52) U.S. Cl.
CPC .............. *G06F 15/17318* (2013.01)

(58) Field of Classification Search
CPC ......... H04L 45/00; H04L 45/12; H04L 45/02; H04L 45/123; H04L 45/124; H04L 29/08072; H04L 29/06; H04L 29/0809; H04L 29/08981; G06Q 30/02; H04B 7/2643; H04B 7/2656; H04W 74/04; H04W 72/0446; H04W 28/04; H04W 88/08
USPC ........................................ 370/238; 709/217
See application file for complete search history.

(56) References Cited

U.S. PATENT DOCUMENTS

| | | | | |
|---|---|---|---|---|
| 4,720,854 A * | 1/1988 | Sand | ................ | H04Q 11/0407 370/360 |
| 5,048,011 A * | 9/1991 | Melen | ................ | H04L 12/5602 340/2.1 |
| 5,070,498 A * | 12/1991 | Kakuma | ............ | H04L 12/5602 370/233 |
| 6,404,756 B1 * | 6/2002 | Whitehill | ............ | H04L 12/2602 370/338 |

(Continued)

OTHER PUBLICATIONS

Multicast in Wormhole-Switched Torus Networks Using Edge-Disjoint Spanning Trees, Journal of Parallel and Distributed Computing, by Honge Wanga, vol. 61, Issue 9, Sep. 2001, pp. 1278-1306.*

(Continued)

*Primary Examiner* — Mahran Abu Roumi
(74) *Attorney, Agent, or Firm* — Ference & Associates LLC

(57) ABSTRACT

Methods and arrangements for performing synchronized collective operations. Communication calls are accepted from at least two distinct processor groups. Edge disjoint spanning paths are created over a collective comprising the processor groups, and the spanning paths are assigned to the processor groups to facilitate communication within each processor group.

11 Claims, 6 Drawing Sheets

(56) References Cited

U.S. PATENT DOCUMENTS

| | | | | |
|---|---|---|---|---|
| 7,467,087 | B1* | 12/2008 | Gillick | G10L 15/26 704/235 |
| 7,639,652 | B1* | 12/2009 | Amis | H04W 40/246 370/238 |
| 7,650,434 | B2* | 1/2010 | Blumrich | G06F 15/17337 709/250 |
| 7,810,093 | B2* | 10/2010 | Jones | G06F 9/4825 718/100 |
| 7,991,857 | B2 | 8/2011 | Berg et al. | |
| 8,958,286 | B1* | 2/2015 | Atlas | H04L 12/18 370/225 |
| 2003/0140165 | A1* | 7/2003 | Chiu | H04L 45/02 709/238 |
| 2003/0185166 | A1* | 10/2003 | Belcea | H04W 40/08 370/321 |
| 2005/0083842 | A1* | 4/2005 | Yang | H04L 12/5695 370/230 |
| 2008/0049631 | A1* | 2/2008 | Morrill | H04L 41/5009 370/250 |
| 2008/0049639 | A1* | 2/2008 | Wiley | H04L 12/2602 370/252 |
| 2008/0178177 | A1* | 7/2008 | Archer | G06F 15/803 718/100 |
| 2008/0195840 | A1 | 8/2008 | Archer et al. | |
| 2008/0285543 | A1* | 11/2008 | Qiu | H04L 69/40 370/352 |
| 2009/0006662 | A1 | 1/2009 | Chen et al. | |
| 2009/0006810 | A1* | 1/2009 | Almasi | G06F 9/54 712/35 |
| 2009/0074404 | A1* | 3/2009 | Suryaputra | H04L 12/24 398/5 |
| 2009/0240915 | A1 | 9/2009 | Faraj | |
| 2011/0010471 | A1* | 1/2011 | Heidelberger | G06F 13/28 710/22 |
| 2011/0131425 | A1* | 6/2011 | Banerjee | G06F 1/3209 713/300 |
| 2011/0173341 | A1* | 7/2011 | Luzzatti | H04L 29/06027 709/232 |
| 2011/0191437 | A1* | 8/2011 | Chen | G06F 15/16 709/217 |
| 2011/0219208 | A1* | 9/2011 | Asaad | G06F 15/76 712/12 |
| 2011/0270986 | A1 | 11/2011 | Archer et al. | |
| 2013/0121156 | A1* | 5/2013 | Rege | H04L 45/026 370/238 |
| 2013/0339506 | A1* | 12/2013 | George | G06F 15/17318 709/223 |
| 2014/0204738 | A1* | 7/2014 | Carter | H04L 41/12 370/230 |

OTHER PUBLICATIONS

Pjesivac-Grbovic, Jelena, et al., "Performance Analysis of MPI Collective Operations", May 15, 2006, 25 pages, University of Texas Computer Science Department, Knoxville, Tennessee, USA.

Almasi, George, et al., "Optimization of MPI Collective Communication on Bluegene/L Systems", Proceedings of the 19th Annual International Conference on Supercomputing, 2005, 10 pages, ACM, New York, New York, USA.

Baransel, Cesur, et al., "Efficient and Scalable Routing Algorithms for Collective Communication Operations on 2D All-Port Torus Networks", International Journal of Parallel Programming 2011, Apr. 16, 2011, 2 pages, Springer Science+Business Media, LLC, Published online at: www.springerlink.com/content/73k8r8702r7x60p5/.

* cited by examiner

PERFORMING SYNCHRONIZED COLLECTIVE OPERATIONS OVER MULTIPLE PROCESS GROUPS

CROSS REFERENCE TO RELATED APPLICATION

The application is a continuation of U.S. patent application Ser. No. 13/495,647, entitled PERFORMING SYNCHRONIZED COLLECTIVE OPERATIONS OVER MULTIPLE PROCESS GROUPS, filed on Jun. 13, 2012, which is incorporated by reference in its entirety.

BACKGROUND

By way of background, HPC (high performance computing) clusters represent a group of computational units connected together in a specific network architecture by a high performance network. Each individual computation unit is called a node; each node can include multiple processors. Some commonly used network architectures are 2D mesh, 3D torus, infiniband and others. HPC applications are mostly scientific applications (e.g., PDE [partial differential equation] computations, computational fluid dynamics) which can be run on massively parallel architecture. Each application includes a number of tasks, where each task performs some computation, and different tasks perform communication.

By way of further background, collective operations denote communication operations involving multiple nodes (>=3). The set of nodes/processors on which the operation is performed is called a communicator in MPI (message parsing interface) terminology, and the communicator denoting all nodes in the system is referred to as MPI_COMM_WORLD. Common collective operations are Broadcast, Reduce, Allreduce, AlltoAll etc., by way of example. The performance of MPI collectives is often critical in determining the performance of parallel scientific applications. Several algorithms are used for performing collective operations such as, for instance, binomial tree, bucket algorithms, recursive doubling, and ring.

Many HPC applications involve synchronized collective operations over multiple processor groups. As such, many scientific applications involve collective operations not only on the entire processor partition, but also on sub partitions (i.e., sub-communicators in MPI). For example, in linear algebra operations, the processor partition is decomposed into row and column partitions to compute matrix multiplication. In 3D FFT via 2D decomposition, there are row and column transposes that result in row and column all-to-all operations. In molecular dynamics, each processor communicates with other processors that contain atoms that interact with the atoms in the original processor, resulting in an arbitrary subset of processors forming a sub-communicator.

Some salient features of problems such as those discussed above are as follows. There is generally more than one processor group, and each node occurs in exactly one processor group. The applications are generally bandwidth bound. The subcommunicator communication should generally be synchronous, i.e. all processors should enter and leave the communication phase at the same time. In conventional implementations, independent processor groups communicate simultaneously. However, these communications can interfere with each other and create a bottleneck.

BRIEF SUMMARY

In summary, one aspect of the invention provides a method comprising: accepting communication calls from at least two distinct processor groups; creating edge disjoint spanning paths over a collective comprising the processor groups; and assigning the spanning paths to the processor groups to facilitate communication within each processor group.

Yet another aspect of the invention provides a method comprising: accepting communication calls from nodes, each node belonging to one of at least two distinct processor groups; communicatively connecting nodes within each processor group; the connecting comprising: creating spanning paths over a union of all processor groups; assigning at least one spanning path to each of the processor groups, to facilitate communication between nodes within each processor group; and configuring the at least one spanning path of a first one of the processor groups to be edge disjoint with respect to the at least one spanning path of a second one of the processor groups.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
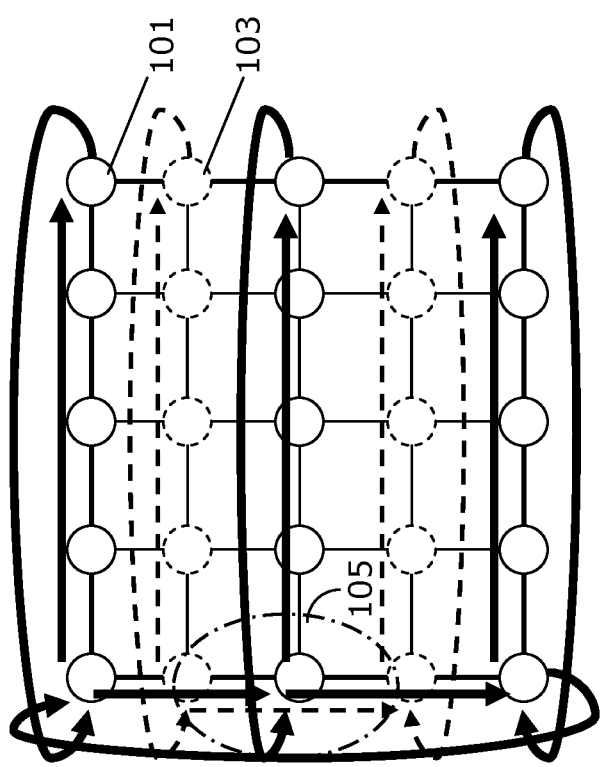
FIG. 1 schematically illustrates an example of a 2-dimensional bidirectional torus where alternate horizontal lines each belong to one processor group.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 6, whether on a server computer, a client computer, a node computer in a distributed network, or any combination thereof.

By way of further background, FIG. 1 schematically illustrates an example of a 2-dimensional bidirectional torus where alternate lines represent a different processor group. In other words, all solid-lined nodes (an example one of which is indicated at 101) are in a first processor group and all dashed-line nodes (an example one of which is indicated at 103) are in a second processor group. Communication among and between nodes of the first processor group, among and between rows thereof, is indicated via thick solid arrows while communication among and between nodes of the second processor group, among and between rows thereof, is indicated via dashed arrows. Straight solid lines indicate links between nodes.

It can be appreciated, now, that when both processor groups perform collective operations simultaneously, there can be link contention as shown in FIG. 1 (via the long dash-dot ellipse 105) for a simple linear ring pipelined algorithm. However, it is generally the case that no conventional algorithm can guarantee that the communication remains contention-free for an arbitrary set of simultaneously communicating subcommunicators covering MPI_COMM_WORLD.

In general, it can now be appreciated that given a set of processor groups such that each node occurs in exactly one of the processor groups, problems have been encountered conventionally in performing efficient synchronized collective operations on the processor groups. Generally, conventional approaches perform collective operations on different processor groups independently. For example, one implementation may adopt a binomial algorithm for each individual processor group. Consequently, such an approach does not readily work where multiple groups operate simultaneously.

Broadly contemplated herein, in accordance with at least one embodiment of the invention, are methods and arrangements for effecting a departure from performing collective communication for each processor group independently. Instead, multiple spanning paths are constructed for the whole and data are pipelined for the individual groups along those paths.

In accordance with at least one embodiment of the invention, a path creation process component returns multiple edge disjoint spanning paths (i.e., no common edge between paths) based on underlying architecture. As such, it can be appreciated that it is efficient to route data through such multiple spanning paths simultaneously, since there is no contention. The path creation process component can use any suitable algorithm based on the architecture under consideration, so for a 2D (2-dimensional) torus, e.g., one can obtain 2 such bandwidth efficient trees etc. On the other hand, a path selection process component assigns a unique path for use to each processor group. It will be appreciated herein that in conventional approaches involving the creation of spanning paths within each communicator and a performance of collective operations, the individual paths create contention in the network since they are not guaranteed to be edge disjoint. In contrast, embodiments of the invention involve the use of the union of all the subcommunicators to identify multiple edge disjoint paths that can be used to pipeline the data for each sub communicator, thereby resulting in less contention.

In accordance with at least one embodiment of the invention, new collective calls (to be added to conventional communication libraries such as MPI) can be called by all nodes and can use a method as described herein to attain better performance. Generally, it can be appreciated herein that there is broadly contemplated a method that uses the property that multiple spanning paths may exist for the processor groups when combined as a whole, but not individually, and uses them to pipeline data for the individual processor groups, thus ensuring optimal performance.

Figure 2:
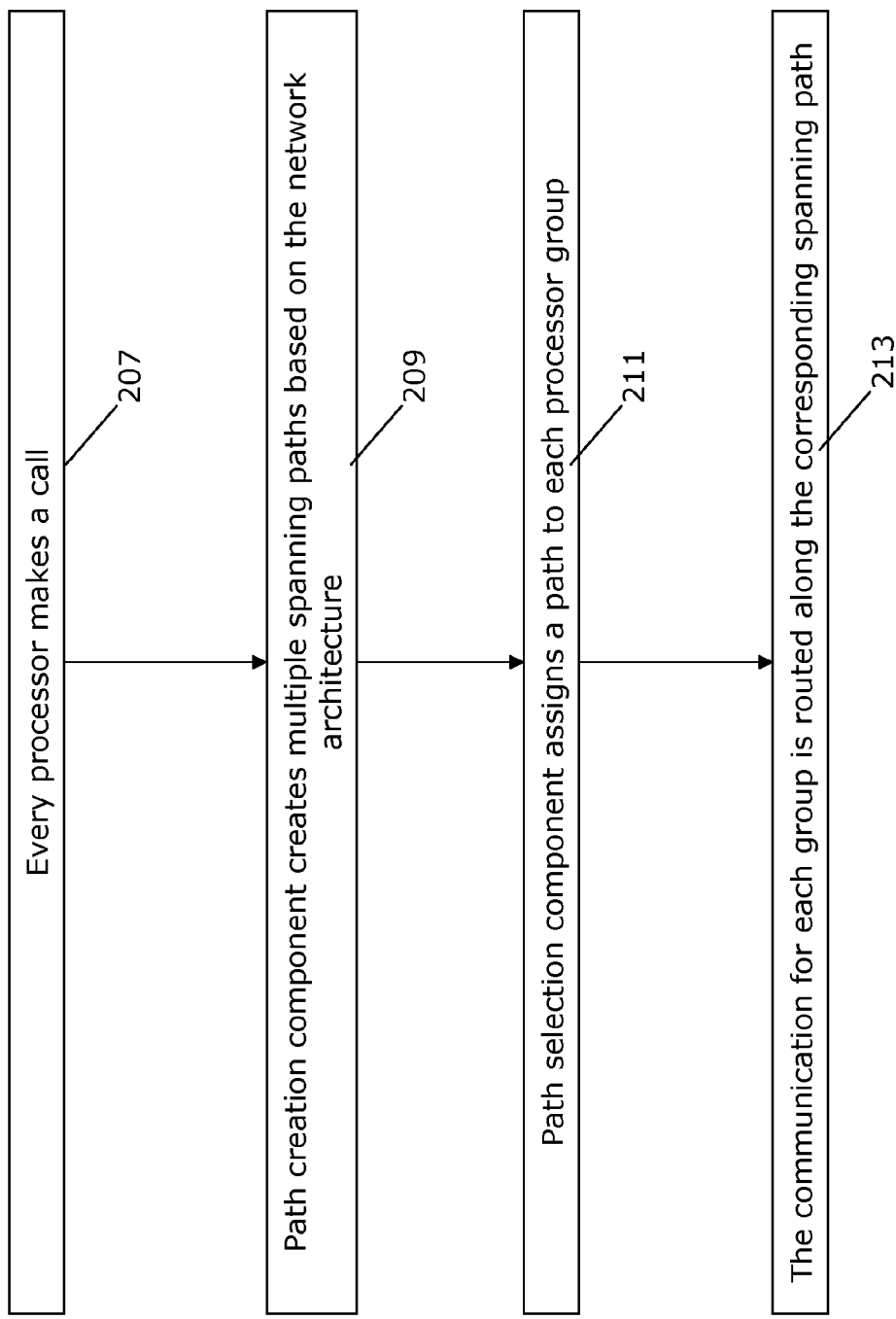
FIG. 2 schematically illustrates a path assignment and routing process.

FIG. 2 schematically illustrates a routing process, in accordance with at least one embodiment of the invention. Every process makes a call (207), which may be of the following form: (globalRank, rankInSubcomm, mySubcomm, OP, *send_buf, *recv_buf). The path creation component then creates multiple spanning paths based on the particular characteristics of the network architecture at hand (209). A path selection component assigns a path to each processor group (211), and communication for each processor group is routed along the corresponding spanning path (213).

Figure 3:
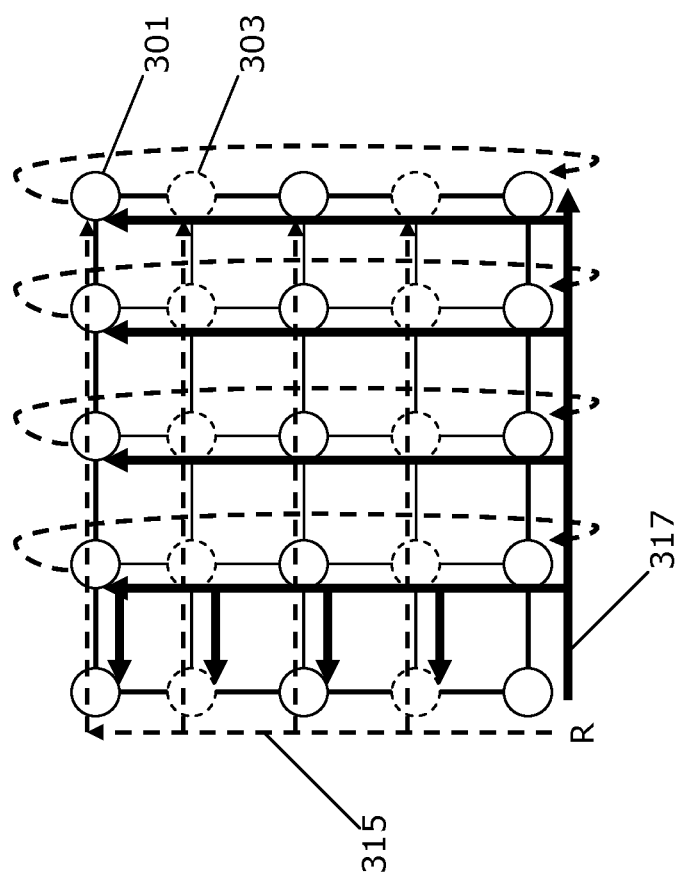
FIG. 3 schematically illustrates an example of a 2-dimensional bidirectional torus with two disjoint spanning paths.

FIG. 3 schematically illustrates an example of a 2-dimensional bidirectional torus with two disjoint paths where alternate rows each belong to a different subcommunicator, in accordance with at least one embodiment of the invention.

If the general example of FIG. 1 is considered, where alternate rows each respectively belong to one subcommunicator, it can now be seen that a 2D bidirectional torus can have two independent bandwidth efficient bidirectional spanning trees by applying a method such as that laid out with respect to FIG. 2.

Figure 4:
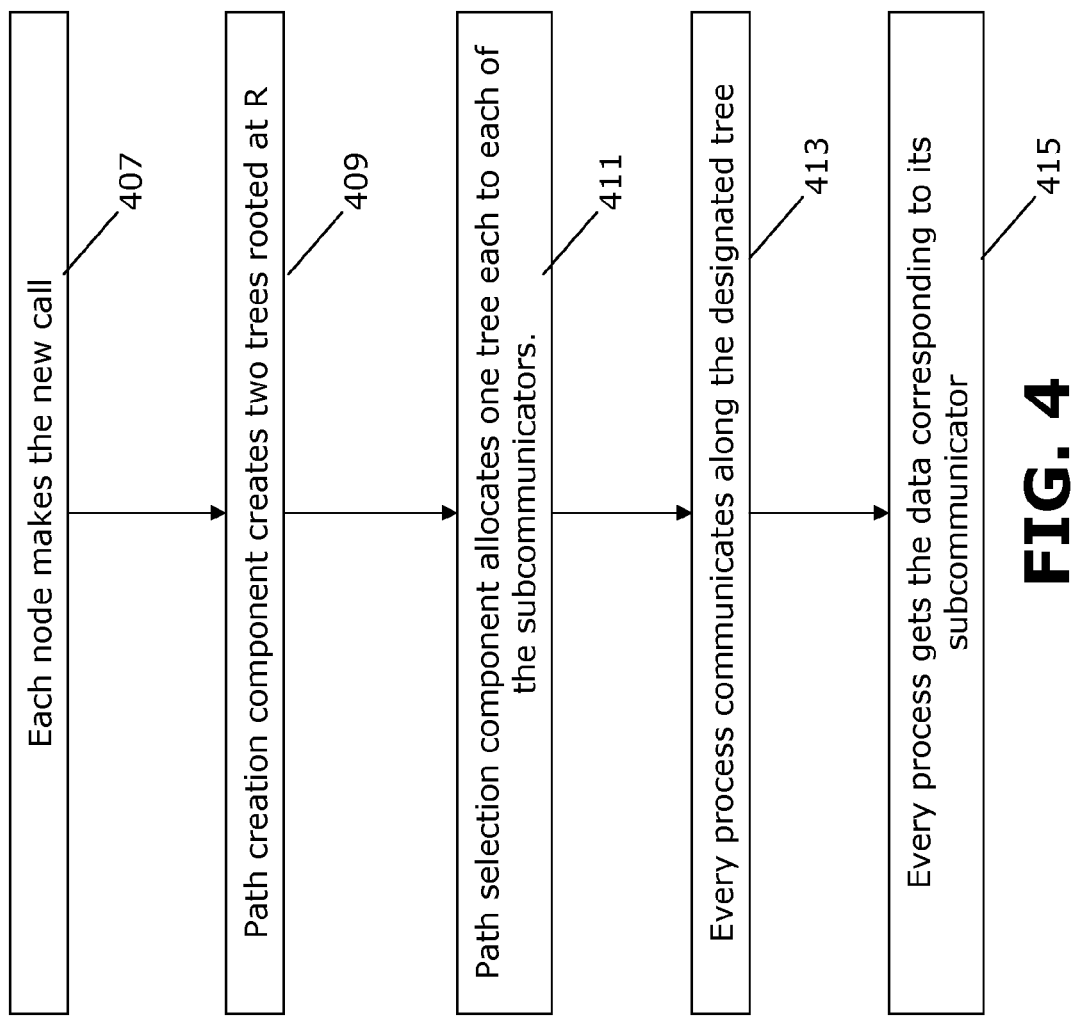
FIG. 4 schematically illustrates a process implementation with respect to the examples of FIGS. 1 and 3.

FIG. 4 schematically illustrates a process implementation with respect to the example of FIG. 3, in accordance with at least one embodiment of the invention. Particularly, FIG. 4 sets forth an example implementation of a process as generally laid out with respect to FIG. 2, and as particularly may be applied to the working example of FIG. 3.

In accordance with at least one embodiment of the invention, each node makes a new call (407). A path creation component creates two trees rooted at R (409), as shown in FIG. 3. The path selection component allocated one tree each to each of the subcommunicators (411), as denoted by the dashed (315) and thick solid (317) arrows in FIG. 3. Every process then communicates along a designated tree (413). Thus, if a node is in the first subcommunicator (solid-lined nodes), it sends its own data for the tree 317 denoted by thick solid arrows and no data for the tree 315 corresponding to the second subcommunicator, which tree is denoted by dashed arrows. Similarly, while receiving data, the nodes in the second subcommunicator will store and forward the data for the tree 317 denoted by the thick solid arrows but only store, and not forward, the data for the tree 315 denoted by the dashed arrows. Thence, every process receives the data corresponding to its subcommunicator (415).

Figure 5:
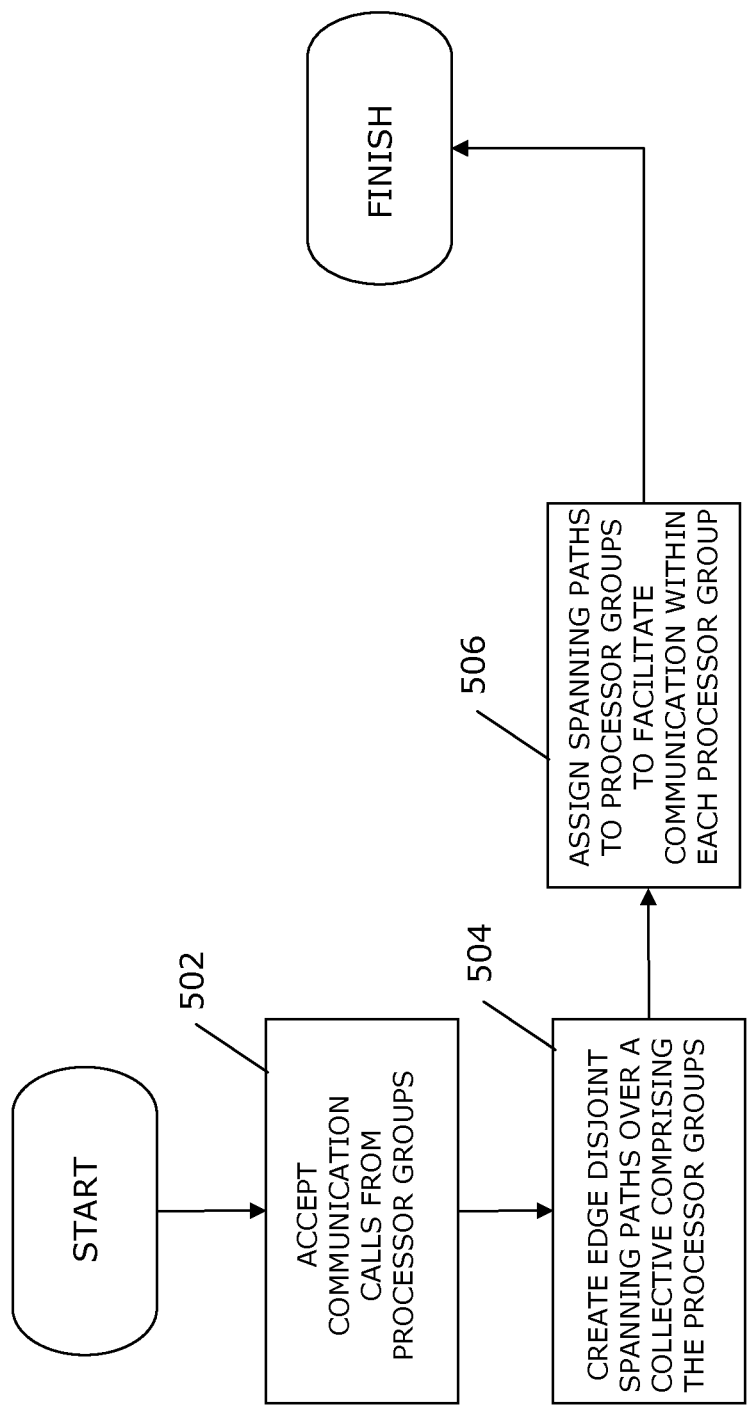
FIG. 5 sets forth a process more generally for performing synchronized collective operations.

FIG. 5 sets forth a process more generally for performing synchronized collective operations, in accordance with at least one embodiment of the invention. It should be appreciated that a process such as that broadly illustrated in FIG. 5 can be carried out on essentially any suitable computer system or set of computer systems, which may, by way of an illustrative and non-restrictive example, include a system such as that indicated at 12' in FIG. 6. In accordance with an example embodiment, most if not all of the process steps discussed with respect to FIG. 4 can be performed by way a processing unit or units and system memory such as those indicated, respectively, at 16' and 28' in FIG. 6.

As shown in FIG. 5, communication calls are accepted from at least two distinct processor groups (502). Edge disjoint spanning paths are created over a collective comprising the processor groups (504), and the spanning paths are assigned to the processor groups to facilitate communication within each processor group (506).

Figure 6:
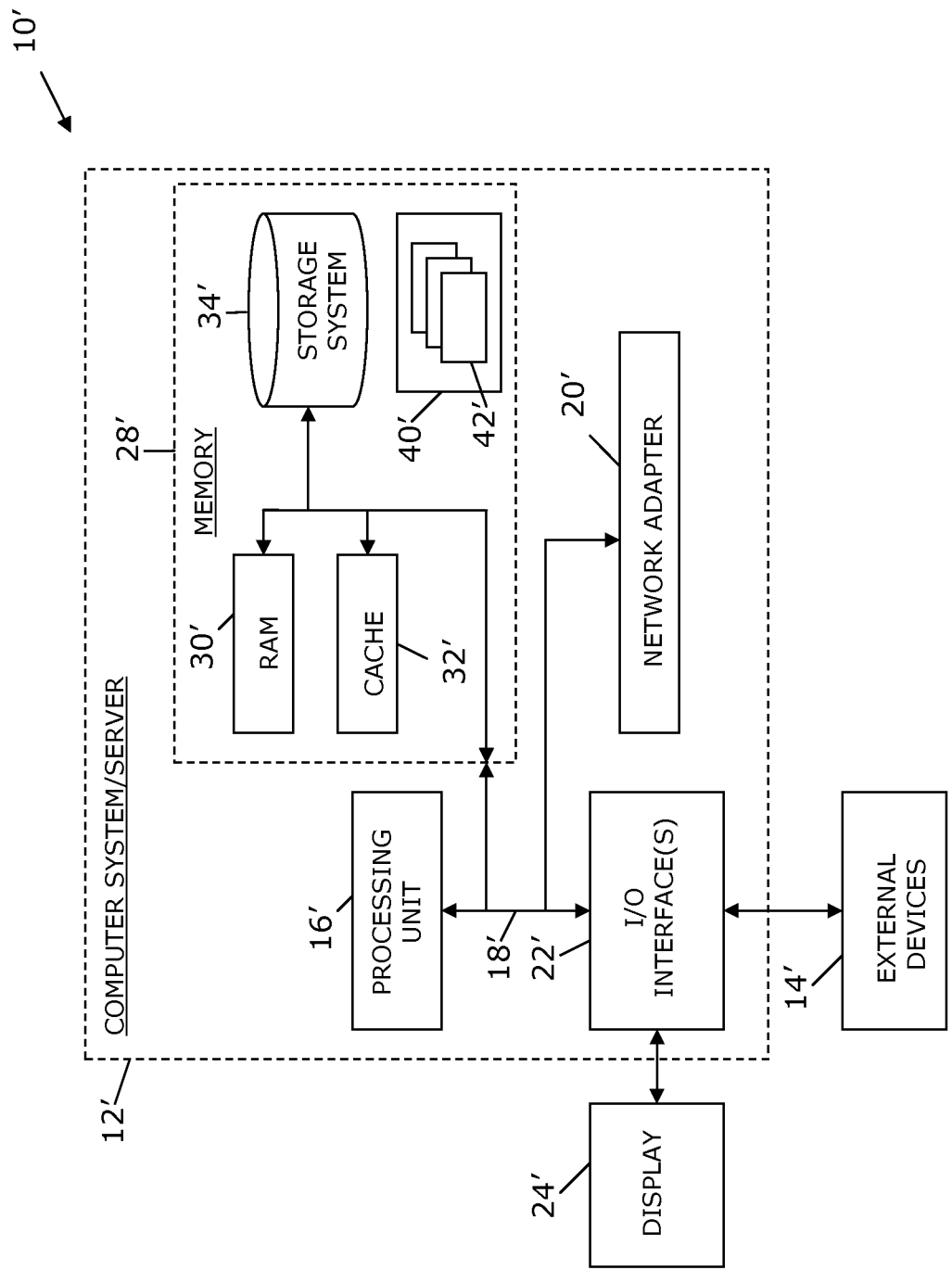
FIG. 6 illustrates a computer system.

Referring now to FIG. 6, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
performing synchronized collective communication operations across a plurality of processing groups simultaneously, wherein the plurality of processing groups are connected together in a network architecture selected from the group consisting of: 2D mesh, 3D torus, and infiniband and wherein each processing group contains a plurality of high performance computing nodes, each of the plurality of nodes occurring in a single processing group, via:
identifying a plurality of characteristics of the network architecture by receiving a call from each of the plurality of nodes, wherein the plurality of characteristics comprises identification of the processing groups via identification of a plurality of sub-communicators and nodes from the plurality of nodes which are connected to each of the plurality of sub-communicators;
constructing, based upon the characteristics of the network architecture, a plurality of communication-efficient bidirectional edge disjoint spanning paths for the plurality of processing groups;
assigning one of the plurality of edge disjoint spanning paths to each processing group, wherein each node is assigned to only one of the plurality of edge disjoint spanning paths and wherein each edge disjoint spanning path comprises only and all nodes assigned to a particular processing group; and
performing synchronized collective communication operations across the plurality of processing groups and reducing communication bottlenecks and preventing contention and interference between communications occurring simultaneously across the plurality of processing groups by routing processing communications for each processing group using only the edge disjoint path assigned to the corresponding processing group.

2. The method according to claim 1, wherein the processor groups are accepted as input.

3. The method according to claim 2, comprising establishing a relationship between the processor groups in accordance with the network architecture and accepting the processor groups as input.

4. The method according to claim 1, wherein the spanning paths comprise at least one member selected from the group consisting of: bandwidth-efficient paths; load-balancing-efficient paths; and power-efficient paths.

5. The method according to claim 1, wherein said receiving a call comprises receiving communication calls from two sub-communicators.

6. The method according to claim 5, wherein said constructing comprises creating two independent bidirectional spanning trees.

7. The method according to claim 6, wherein said creating of two spanning trees comprises allocating one tree to each of the two sub-communicators.

8. The method according to claim 7, wherein said allocating comprises according a data forwarding function to a spanning tree with respect to nodes of the sub-communicator to which the spanning tree is allocated.

9. The method according to claim 8, wherein said allocating comprises suppressing a data forwarding function to a spanning tree with respect to nodes of the sub-communicator to which the spanning tree is not allocated.

10. The method according to claim 6, wherein the two spanning trees are commonly rooted.

11. The method of claim 1, wherein the plurality of disjoint spanning paths comprise bandwidth-efficient paths.

* * * * *